(12) United States Patent
Hendrix

(10) Patent No.: US 6,592,135 B2
(45) Date of Patent: Jul. 15, 2003

(54) VEHICLE RUNNING BOARD DETACHABLE FOR USE AS LOADING RAMP

(76) Inventor: Theron V. Hendrix, 948 Allegheny Dr., Colorado Springs, CO (US) 80919

(*) Notice: Subject to any disclaimer, the term of this patent is extended or adjusted under 35 U.S.C. 154(b) by 0 days.

(21) Appl. No.: 09/886,848

(22) Filed: Jun. 25, 2001

(65) Prior Publication Data

US 2002/0195792 A1 Dec. 26, 2002

(51) Int. Cl.[7] ............................................. B60R 3/00
(52) U.S. Cl. ..................... 280/164.1; 280/163; 296/75; 14/71.1
(58) Field of Search .............................. 280/163, 164.1, 280/164.2, 169, 166; 296/75; 14/69.5, 71.1, 71.5

(56) References Cited

U.S. PATENT DOCUMENTS

| | | | | |
|---|---|---|---|---|
| 854,329 A | * | 5/1907 | Charron | 14/14 |
| 1,310,973 A | * | 7/1919 | Von Schrenk | 224/42.32 |
| 1,366,570 A | * | 1/1921 | La Croix et al. | 15/237 |
| 1,678,657 A | * | 7/1928 | Thomas | 280/163 |
| 1,732,994 A | * | 10/1929 | Spiro | 280/163 |
| 1,780,318 A | * | 11/1930 | Snyder | 105/422 |
| 2,141,529 A | * | 12/1938 | Gravelle | 14/2.4 |
| 3,140,891 A | * | 7/1964 | Shreffler | 280/163 |
| 4,911,264 A | * | 3/1990 | McCafferty | 182/150 |
| 4,982,974 A | * | 1/1991 | Guidry | 182/91 |
| 5,026,243 A | * | 6/1991 | Dell | 14/71.1 |
| 5,193,829 A | * | 3/1993 | Holloway et al. | 280/163 |
| 5,286,049 A | * | 2/1994 | Khan | 280/163 |
| 5,494,393 A | * | 2/1996 | Schrunk | 14/69.5 |
| 5,685,594 A | * | 11/1997 | Harper | 292/175 |
| 5,769,439 A | * | 6/1998 | Thompson | 280/163 |
| 5,788,321 A | * | 8/1998 | McHorse et al. | 280/163 |
| 5,823,553 A | * | 10/1998 | Thompson | 280/163 |
| 5,895,064 A | * | 4/1999 | Laubach | 248/205.1 |
| 5,926,889 A | * | 7/1999 | Riesselmann et al. | 14/69.5 |
| 5,938,397 A | * | 8/1999 | Schouest | 14/69.5 |
| 6,116,633 A | * | 9/2000 | Pride | 280/416.1 |
| 6,267,398 B1 | * | 7/2001 | Lombard | 14/2.4 |

* cited by examiner

*Primary Examiner*—Brian L. Johnson
*Assistant Examiner*—Kelly E Campbell
(74) *Attorney, Agent, or Firm*—G. F. Gallinger

(57) ABSTRACT

A running board assembly for pick-up trucks, vans, and sport utility vehicles which has a detachable runner which used as a loading ramp when and wherever a loading ramp is needed to load the vehicle. The assembly not only provides the convenience of a running board which divides the long stretch when stepping into the vehicle; but additionally, it provides a convenient and unobtrusive means of carrying loading ramps in vehicles which typically lack the storage capacity, and particularly the length in their storage bed, to carry a loading ramp. The running board assembly comprises: a front and rear mounting bracket each secured to a lower central side portion of the vehicle; an elongate runner releasably engaging, and carried by the front and rear mounting brackets; and, releasable lock means to releasably lock the elongate runner board on the brackets.

18 Claims, 1 Drawing Sheet

VEHICLE RUNNING BOARD DETACHABLE FOR USE AS LOADING RAMP

FIELD OF THE INVENTION

This invention relates to accessories for pick-up trucks, vans, and sport utility vehicles. More particularly this invention relates to running boards for such vehicles which can be detached when and wherever a loading ramp is needed to load the vehicle.

BACKGROUND OF THE INVENTION

One of the most common accessories added to pick-up trucks, vans, and sport utility vehicles are running boards. Compared to passenger vehicles, these vehicles have wheels which are larger in diameter, and a chassis which is substantially elevated. Smaller and less agile individuals frequently prefer the convenience of a running board which divides the long stretch when stepping into the vehicle. Another short coming which these vehicles share is that they generally lack the storage capacity and particularly the length in their storage bed to carry a loading ramp. Loading ramps particularly facilitate carrying motorcycles, all terrain vehicles, lawn tractors, lawn mowers, snow blowers, and any other wheeled, or a non wheeled load on a dolly. A convenient and unobtrusive means of carrying loading ramps on a vehicle is needed. Preferably this means of carrying loading ramps on the vehicle should be so convenient that it is practical to carry the loading ramps with the vehicle at all times so that the ramps will be readily available whenever they are needed.

OBJECTS OF THE INVENTION

It is an object of this invention to disclose a convenient and unobtrusive means of carrying loading ramps on a vehicle. With this invention it is practical to carry the loading ramps with the vehicle at all times, so that the ramps will be readily available whenever they are needed. It is another object of this invention to disclose a vehicle running board which is detachable for use as a loading ramp. With this detachable running board, space in the carrying bed of the vehicle is not occupied, and the limitation of length in the carrying bed is not a problem. It is yet a further object of this invention to disclose a method of releasably attaching a detachable ramp to a vehicle which is convenient, inexpensive and reliable. It is yet a further object of this invention to disclose a safer loading ramp, a ramp which has upwardly extending edge portions to guide and ensure that a wheel being rolled therealong does not roll thereoff. It is a final object of this invention to disclose an attractive design for a running board, which when inverted provides a functional ramp having a safe, recessed wheel track.

One aspect of this invention provides for a running board assembly, for a vehicle having a load carrying bed, which is detachable for use as a loading ramp, comprising: a front and rear mounting bracket each secured to a lower central side portion of the vehicle; an elongate runner releasably engaging, and carried by the front and rear mounting brackets; and, releasable lock means to releasably lock the elongate runner board on the brackets. In normal use the elongate runner is mounted on, and carried by the mounting brackets on the vehicle. When a loading ramp is required, the elongate runner is released and removed, used as a loading ramp, and then replaced to its position of normal use.

A method of carrying a loading ramp on a vehicle having a load carrying bed, comprises the following steps: a) securing a front and rear mounting bracket to a lower central side portion of the vehicle; b) providing an elongate runner releasably engaging, and carried by the front and rear mounting brackets; and, c) providing a releasable lock means to releasably lock the runner on the brackets; d) releasing the lock means and detaching the runner from the mounting brackets when the loading ramp is required; and then, e) positioning one end portion of the runner on an edge portion of the bed of the vehicle, thereby providing a ramp to the carrying bed of the vehicle; and finally, f) replacing and releasably locking the runner on the mounting brackets for normal use.

Various other objects, advantages and features of this invention will become apparent to those skilled in the art from the following description in conjunction with the accompanying drawings.

FIGURES OF THE INVENTION

FIG. 2 shows an end mounting bracket slidably positioned through and locking an elongate runner on the bracket.

FIG. 3 shows a center mounting bracket slidably positioned through the elongate runner.

Figure 1:
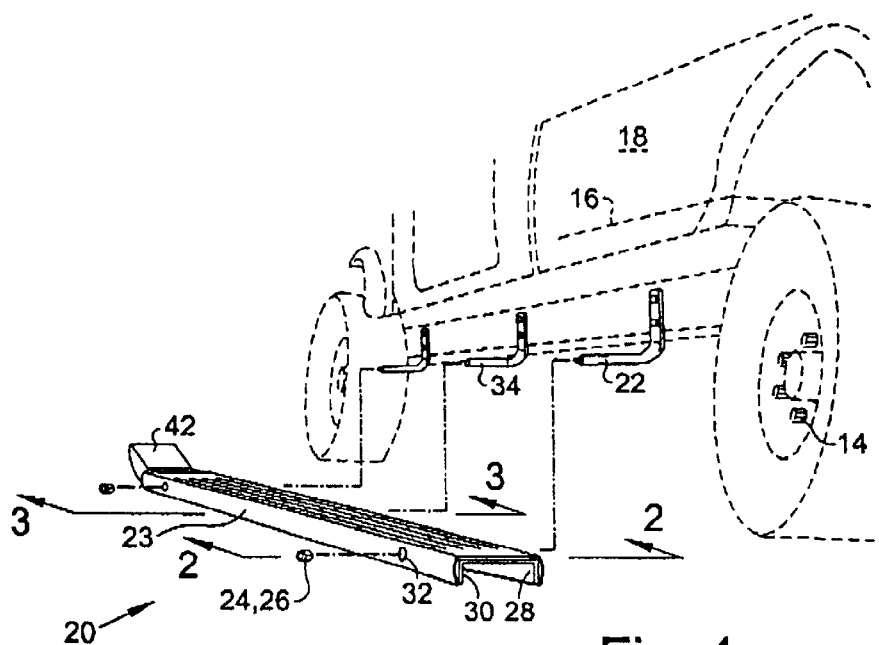
FIG. 1 is a perspective view of a detachable running board assembly detached from its mounting brackets on a vehicle.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a detachable running board assembly 20 detached from its mounting brackets 22 on a vehicle 18. The detachable running board assembly 20 is used with a vehicle 18 having a load carrying bed 16. It is detachable for use as a loading ramp 21. The detachable running board assembly 20 comprises: a front and rear mounting bracket 22 each secured to a lower central side portion of the vehicle 18; an elongate runner 23 releasably engaging, and carried by the front and rear mounting brackets 22; and, releasable lock means 24 to releasably lock the elongate runner 23 on the brackets 22. In normal use the elongate runner 23 is mounted on, and carried by the mounting brackets 22 on the vehicle 18 When a loading ramp 21 is required, the elongate runner 23 is released and removed, used as a loading ramp 21, and then replaced to its position of normal use.

Figures 2, 3:
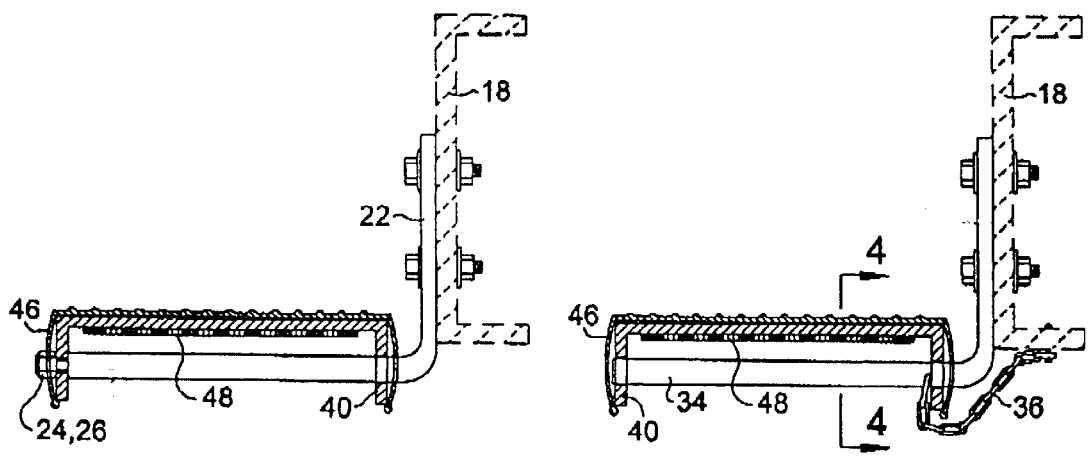
FIG. 2 is a cross sectional view of the running board assembly as viewed along line 2—2 on FIG. 1.
FIG. 3 is a cross sectional view of the running board assembly as viewed along line 3—3 on FIG. 1.

FIG. 2 is a cross sectional view of the running board assembly 20 as viewed along line 2—2 on FIG. 1. Most preferably, the elongate runner 23 has extended lower edge portions 28 on its lower side portion, so that when the elongate runner 23 is inverted its bottom side portion, which is then facing up, provides a recessed wheel track 30 therealong. The recessed wheel track 30 ia a safety feature. The recessed wheel track 30 ensures that loads do not roll off the loading ramp 21. If the front and rear mounting brackets 22 extend laterally outward from the lower side portion of the vehicle 18 as shown in FIG. 2, and the elongate runner 23 has lateral openings 32 therethrough, then the elongate runner 23 may slide over the mounting brackets 22. Most preferably, the releasable lock means 24 to releasably lock the elongate runner 23 on the brackets 22 comprises a threaded shaft 25 and nut 26 which tightens against an outer edge portion of the elongate runner 23 so that the lock means 24 is readily accessible when the elongate runner 23 is carried by the front and rear mounting brackets 22. And if the nut 26 is sized similarly to nuts on the vehicle's wheels 14, then the elongate runner 23 may be removed with a wheel wrench (not shown).

Figure 4:
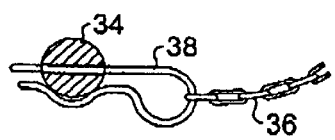
FIG. 4 is a cross sectional view of a quick release safety cotter pin as viewed along line 4—4 on FIG. 3.

FIG. 3 is a cross sectional view of the running board assembly 20 as viewed along line 3—3 on FIG. 1. FIG. 3 shows a center mounting bracket 34 slidably positioned through the elongate runner 23. In this preferred embodiment of the invention, the running board assembly 20 further comprises a center mounting bracket 34 and a safety cotter pin 36 which may be sprung open to insert through the center mounting bracket 34, thereby preventing the elongate runner 23 from sliding off the mounting bracket 34. FIG. 4 is a cross sectional view of a quick release safety cotter pin 38 as viewed along line 4—4 on FIG. 3. A tether 36 secures the safety cotter pin 38 to the center mounting bracket 34.

Figure 5:
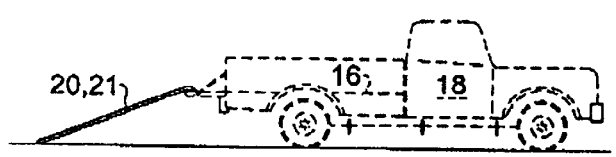
FIG. 5 is an elevational view of a detached elongate runner, inverted, and positioned as a loading ramp on a vehicle.

An end portion of the elongate runner 23 comprises a sloped runner end portion 42 which is inclined with respect to a central portion of the running board, to extend along and seat closely on the rear edge portion of the load carrying bed 16 of the vehicle 18 when the elongate runner 23 is inverted and an opposite end portion thereof is seated on the ground 44. In the most preferred embodiment of the invention the elongate runner 23 comprises a channel 40. An extruded moulding 46 is sized to cover a top, an interior, and an exterior side portion of the channel 40. It is contemplated that the moulding 46 will be extruded aluminum. The moulding 46 will be sized to slidably receive the channel 40 therein. A gripping strip 48 which may be made from expanded metal is adhered to an inner side portion of the channel 40 so that when the runner 23 is inverted the gripping strip 48 will provide traction on an incline. FIG. 5 is an elevational view of a detached elongate runner 23, inverted, and positioned as a loading ramp 21 on the vehicle 18. It should be noted that the load carrying bed 16 of the vehicle 18 is defined within this specification to include any and all portions of the vehicle 18 adjacent to a rear portion of the load carrying bed 16.

A method of carrying a loading ramp 21 on a vehicle 18 having a load carrying bed 16, comprises the following steps: a) securing a front and rear mounting bracket 22 to a lower central side portion of the vehicle 18; b) providing an elongate runner 23 releasably engaging, and carried by the front and rear mounting brackets 22; and, c) providing a releasable lock means 24 to releasably lock the runner 23 on the brackets 22; d) releasing the lock means 24 and detaching the runner 23 from the mounting brackets 22 when the loading ramp 21 is required; and then, e) positioning one end portion of the runner 23 on an edge portion of the bed 16 of the vehicle, thereby providing a ramp to the carrying bed 16 of the vehicle 18; and finally, f) replacing and releasably locking the runner 23 on the mounting brackets 22 for normal use. The method may be narrowed by using the more precisely defined embodiments of the invention as described in the above paragraphs.

While the invention has been described with preferred specific embodiments thereof, it will be understood that this description is intended to illustrate and not to limit the scope of the invention, which is defined by the following claims.

I claim:

1. A running board assembly, for a vehicle having a load carrying bed, which is detachable for use as a loading ramp inclinably extending from ground beneath the vehicle to a rear end portion of the bed, comprising:
   a front and rear mounting bracket each secured to a lower central side portion of the vehicle;
   an elongate runner releasably engaging, and carried by the front and rear mounting bracket, one end portion of the elongate runner having a sloped runner end portion engagement with a rear portion of the load carrying bed when an opposite end portion of the elongate runner is seated on the ground, sloped runner end portion capable of providing a safe, stable, and continuous supporting surface for loading; and,
   releasable lock means to releasably lock the elongate runner board on the brackets;
   wherein normal use the elongate runner is mounted on, and carried by the mounting brackets on the vehicle; and when a loading ramp is required, the elongate runner is released removed and inverted, used as a loading ramp, and then replaced to its position of normal use.

2. A running board assembly as in claim 1 wherein a sloped runner end portion rigidly extends along and is inclined with respect to a central portion of the running board, to seat closely on the rear edge portion of the load carrying bed of the vehicle when the runner is inverted and an opposite end portion thereof is seated on the ground.

3. A running board assembly as in claim 2 wherein the elongate runner has extended lower edge portions on its lower side portion, so that when the elongate runner is inverted its bottom side portion, which is then facing up, provides a recessed wheel track therealong.

4. A running board assembly as in claim 3 which comprises a channel.

5. A running board assembly as in claim 4 further comprising a gripping strip adhered to an inner side portion of the channel so that when the runner is inverted the gripping strip will provide traction on an incline.

6. A running board assembly as in claim 2 wherein the front and rear mounting brackets extend laterally outward from the lower side portion of the vehicle and wherein the elongate runner has lateral openings therethrough so that the elongate runner may slide over the mounting brackets.

7. A running board assembly as in claim 6 wherein the releasable lock means to releasably lock the elongate runner on the brackets comprises a threaded shaft and nut which tightens against an outer edge portion of the elongate runner so that the nut is readily accessible when the runner is carried by the front and rear mounting brackets.

8. A running board assembly as in claim 7 wherein the nut is sized to match nuts on the vehicles wheels so that the runner may be removed with a wheel wrench.

9. A running board assembly as in claim 8 further comprising a center mounting bracket and a safety cotter pin which may be sprung open to insert through the center mounting bracket, thereby preventing the runner from sliding off the mounting bracket.

10. A running board as in claim 8 further comprising a tether having one end attached to the safety cotter pin and the other end attached to the center mounting bracket.

11. A running board assembly as in claim 2 further comprising an extruded moulding sized to cover a top and exterior side portion of the channel.

12. A running board assembly as in claim 11 wherein the extruded moulding additionally covers an inner side portion of the channel, and wherein the channel may be slidably received within the moulding.

13. A method of carrying a loading ramp on a vehicle having a load carrying bed, comprising the following steps:

securing a front and rear mounting bracket to a lower central side portion of the vehicle;

providing an elongate runner, one end portion of the elongate runner having a sloped runner end portion for engagement with a rear portion of the load carrying bed when an opposite end portion of the elongate runner is seated on the ground, said elongate runner releasably engaging, and carried by the front and rear mounting brackets; and, providing a releasable lock means to releasably lock the runner on the brackets;

releasing the lock means and detaching the runner from the mounting brackets when the loading ramp is required; inverting the runner, and then, positioning the one end portion of the runner on a rear edge portion of the bed of the vehicle, thereby providing a ramp to the carrying bed of the vehicle; and finally, replacing and releasably locking the runner on the mounting brackets for normal use.

14. A method as in claim 13 wherein the runner has extended lower edge portions on its lower side portion, so that when the runner is inverted its bottom side portion, which is then facing up, has a recessed wheel track therealong.

15. A method as in claim 14 wherein the front and rear mounting brackets extend laterally outward from the lower side portion of the vehicle and wherein the runner has lateral openings therethrough so that the runner may slide over the mounting brackets.

16. A method as in claim 15 wherein the releasable lock means to releasably lock the runner on the brackets comprises a threaded stud and nut which tightens against an outer edge portion of the runner so that it is readily accessible when the runner is carried by the front and rear mounting brackets.

17. A method as in claim 13 wherein the sloped runner end portion which extends along and is inclined to seat closely on the rear edge portion of the load carrying bed of the vehicle when the runner is inverted and an opposite end portion of the elongate runner is seated on the ground.

18. A method as in claim 17 wherein the runner comprises a channel.

* * * * *